United States Patent [19]

Tahara

[11] Patent Number: 5,300,169

[45] Date of Patent: Apr. 5, 1994

[54] TRANSFER FOIL HAVING REFLECTING LAYER WITH FINE DIMPLE PATTERN RECORDED THEREON

[75] Inventor: Shigehiko Tahara, Tokyo, Japan

[73] Assignee: Dai Nippon Printing Co., Ltd., Tokyo, Japan

[21] Appl. No.: 826,063

[22] Filed: Jan. 24, 1992

[30] Foreign Application Priority Data

Jan. 28, 1991 [JP] Japan .................................. 3-008384
Feb. 1, 1991 [JP] Japan .................................. 3-012183
Mar. 11, 1991 [JP] Japan .................................. 3-043932

[51] Int. Cl.⁵ .............................................. B44C 1/165
[52] U.S. Cl. .................................. 156/230; 156/234; 156/240; 359/3; 359/15; 430/1; 430/2
[58] Field of Search ............. 156/230, 233, 240, 234, 156/277, 283, 284; 430/1, 2; 283/86, 904; 359/3, 15

[56] References Cited

U.S. PATENT DOCUMENTS

| | | | |
|---|---|---|---|
| 4,012,552 | 3/1977 | Watts | 156/233 X |
| 4,657,803 | 4/1987 | Pernicano | 156/230 X |
| 4,728,377 | 3/1988 | Gallagher | 156/233 X |
| 4,892,602 | 1/1990 | Oike et al. | 156/233 |

*Primary Examiner*—David A. Simmons
*Assistant Examiner*—Paul M. Rivard
*Attorney, Agent, or Firm*—Dellett and Walters

[57] ABSTRACT

A method wherein a hologram is transferred from a transfer foil formed with a fine dimple pattern and having a reflecting layer, and information, e.g., an image or a character, other than information originally recorded on the hologram is added to the transferred hologram. The method comprises preparing a transfer foil having a reflection relief hologram comprising a resin layer having a fine dimple pattern, e.g., a relief hologram, a relief diffraction grating, etc., formed on the surface thereof, and a reflecting layer formed on the dimpled surface of the resin layer, transferring at least a part of the hologram to the surface of an object, and heating a part of the transferred portion with a heating device, thereby destroying the reflecting layer to record another information. Also disclosed are a method which enables a fine hologram pattern to be readily transferred to a large area, a transfer foil having a reflecting layer which enables a fine dimple pattern to be transferred precisely with excellent foil breaking characteristics, and a method of producing such a fine dimple pattern transfer foil.

4 Claims, 8 Drawing Sheets

Chipping    Tailing

TRANSFER FOIL HAVING REFLECTING LAYER WITH FINE DIMPLE PATTERN RECORDED THEREON

BACKGROUND OF THE INVENTION

The present invention relates to a transfer foil having a reflecting layer with a fine dimple pattern recorded thereon, for example, a transfer type reflection relief hologram, a reflection relief diffraction grating, etc.

In this application, a first invention relates to an information recording method wherein information recorded on a transfer foil is transferred to a substrate by a thermal recording head, for example, and information that is different from the information originally recorded on the transfer foil is recorded and displayed on the portion of the substrate where the original information has been transferred. The invention also relates to an information recording medium having information recorded thereon by the above-described method.

A second invention relates to a reflection relief hologram transfer foil which is formed in a specific transfer type, and also to a selective transfer method for a reflection relief hologram which employs such a transfer foil. More particularly, the invention relates to a transfer foil which enables a fine hologram pattern to be readily transferred to a large area, and to a transfer method employing such a transfer foil.

A third invention relates to a transfer foil having on the surface thereof an extremely fine dimple pattern, for example, a hologram, a building material, an optical recording medium, etc., which can be transferred in a precise pattern by a hot stamper, a thermal head or the like. The invention also relates to a method of producing such a transfer foil.

Holograms, in which information is recorded generally in the form of interference patterns of light, are used in various fields as high-density information recording media for recording and displaying two- and three-dimensional images and other information. Among them, relief holograms are formed in such a manner that a holographic interference fringe pattern is recorded in the form of a dimple pattern on a photoresist, for example, and the dimple pattern is transferred by plating, for example, to form a stamper, which is then stamped on a transparent thermoplastic resin material with or without a reflecting layer of a metal or the like formed on the surface thereof, thereby making a large number of duplicates. Relief holograms wherein a reflecting layer, e.g., a metal layer or a high refractive index layer, is provided on the relief surface and an image is reconstructed by light reflected and diffracted by the reflecting layer include two different types, in one of which the incident light is reflected substantially completely by the reflecting layer, while in the other part of the incident light is reflected to reconstruct a hologram image on a background of transmitted light. In this application, these two types are included in the reflection relief holograms. In addition, another type of relief hologram in which the dimple pattern comprises phase diffraction grating patterns properly arranged is also considered to be included in the reflection relief holograms.

A typical reflection relief hologram has a sectional structure shown in FIG. 10, and it comprises a hologram layer 1 of a thermoplastic resin material or the like and a reflecting layer 2 formed on a dimple interference fringe surface (i.e., relief surface) defined by the surface of the hologram layer 1. The reflecting layer 2 comprises either a deposited metal film, e.g., aluminum or tin, or a high refractive index transparent film, e.g., zinc sulfide. With a deposited metal film, a reflection relief hologram that reflects the incident light substantially completely by the metal is formed. With a high refractive index transparent film, the resulting reflection relief hologram is of the type in which part of the incident light is reflected to reconstruct a hologram image on a background of transmitted light because of Fresnel reflection based on the refractive index difference between the hologram layer 1 and the reflecting layer 2. Such a reflection relief hologram may be produced by either of the following two methods: one in which holographic information is recorded in the form of a dimple pattern on a photoresist, for example, and the dimple pattern is transferred by plating, for example, to form a stamper, which is then stamped on a transparent thermoplastic resin material that constitutes a hologram layer 1 to duplicate the dimple pattern, and a reflecting layer 2 is formed on the duplicated dimple pattern by deposition or the like; and the other in which a reflecting layer 2 is previously formed on a transparent resin layer that forms a hologram layer 1, and a stamper formed with the above-described dimple pattern is hot-stamped on the reflecting layer 2 to duplicate the dimple pattern (for example, see Japanese Patent Application Laid-Open (KOKAI) No. 58-65466 (1983)).

Incidentally, such a reflection relief hologram can be arranged in the form of a transfer foil (for example, see Japanese Patent Application Laid-Open (KOKAI) No. 01-283583 (1989)). FIG. 11 shows a section of the transfer foil. In order to enable the reflection relief hologram shown in FIG. 10 to be transferable, a base film 4 of PET (polyethylene terephthalate) or the like is provided on the side of the hologram layer 1 opposite to the side thereof where the reflecting layer 2 is provided, through a release layer 3 of wax or the like, and a heat-sensitive adhesive layer 5 of a vinyl chloride resin or the like is provided on the reflecting layer 2. The hologram layer 1 and the reflecting layer 2 in a desired profile region of a transfer foil having the above-described arrangement may be transferred to a substrate of vinyl chloride, for example, by using, for example, a thermal recording head or a hot stamper, as follows: The transfer foil is set in between a substrate 6 to which the hologram is to be transferred and a thermal recording head or hot stamper 7 such that the heat-sensitive adhesive layer 5 faces the substrate 6, while the base film 4 faces the thermal recording head or hot stamper 7, and in this state the thermal recording head 7 is driven or the hot stamper 7 is pressed under heating.

Thus, the reflection relief hologram has heretofore been transferred to the substrate 6, e.g., a card, as shown in FIG. 12, to display visible information, e.g., a mark, an image, etc., on a card or the like. However, it has been impossible to record and display in the transfer region image information, character information, etc. other than the information originally recorded on the transfer foil.

Further, in either the transfer method employing a hot stamper or the transfer method employing a thermal recording head, only the transfer hologram pattern portion is heated from the side of the base film which is remote from the hologram layer, a heat or pressure dispersion phenomenon occurs in the base film, so that it is difficult to reproduce the desired pattern strictly.

Thus, the prior art is unsuitable for transfer of a fine pattern.

Incidentally, there has heretofore been a known method of duplicating a large number of transfer foils having an extremely, fine dimple pattern, for example, a relief hologram, a diffraction grating, an optical information recording medium, etc., as described above. According to this method, a resin layer that is provided on a base film through a release layer is softened by heat-pressing to form a dimple pattern, thereby duplicating a large number of transfer foils by embossing.

It is common for most of these dimple pattern transfer foils to form a reflecting layer of a metal or the like by plating technique on a dimple pattern formed on a resin layer in order to enhance the optical effectiveness of the dimple pattern.

However, the method, in which a metal thin film layer is provided on a dimple pattern formed on a resin layer, involves the problem that during the formation of a dimple pattern on the resin layer, the material of the resin layer may be transferred to a dimple forming stamper due to the release resistance occurring between the stamper and the resin layer. If silicone or the like is added to the resin layer to reduce the release resistance of the transfer foil in order to prevent the described problem, the adhesion with a reflecting layer formed subsequently lowers, so that the reflecting layer becomes likely to separate. If the film breaking strength of the resin layer is increased, the release characteristics and foil breaking characteristics required for the transfer process deteriorate, so that it becomes difficult to transfer a fine pattern.

When a dimple pattern is formed on a resin layer of a thermoplastic resin material under heating, there is a need for a process of releasing the resin layer from the stamper after cooling it because it is likely that the dimple pattern formed will be deformed by the heat remaining after the release.

In addition, when a metal thin film layer is formed on a dimple pattern, the dimple pattern may be deformed by heat or chemical influence during plating process or it may be impossible to obtain a reflecting layer with a uniform thickness distribution due to the dimple pattern. It is also likely that mixing of dust will cause a pinhole or adhesion failure. Thus, the prior art suffers from problems in terms of quality.

In addition, when the take-up type semicontinuous deposition method or the like is employed for the formation of a reflecting layer, the process efficiency is inferior in that a reflecting layer is deposited each time the embossing process has been completed, so that it is disadvantageous to small lot products in terms of both cost and time.

SUMMARY OF THE INVENTION

In view of the above-described circumstances, it is a first object of the present invention to provide a method of adding to a hologram, transferred from a reflection relief hologram of the type described above, information, for example, an image or a character, other than the information originally recorded on the reflection relief hologram, and also provide an information recording medium having information recorded thereon by this method.

It is a second object of the present invention to provide a reflection relief hologram transfer foil which is arranged to enable a fine transfer hologram pattern to be readily formed over a large area, and also provide a selective transfer method for a reflection relief hologram which employs such a transfer foil.

It is a third object of the present invention to provide a fine dimple pattern transfer foil having a reflecting layer which enables a fine dimple pattern to be transferred precisely with excellent foil breaking characteristics by a hot stamper, a thermal head or the like, and also provide a method of producing such transfer foils, particularly reflection relief holograms, that is, a method of emboss-duplicating a transfer foil having a fine dimple pattern faithful to the original plate with excellent release characteristics and superior foil breaking characteristics by press-embossing a fine dimple pattern on a substrate through a reflecting layer which has been formed thereon in advance.

To attain the first object, the first invention provides an information recording method comprising the steps of: preparing a transfer foil having a reflection relief hologram comprising at least a resin layer having a fine dimple pattern, e.g., a relief hologram, a relief diffraction grating, etc., formed on the surface thereof, and a reflecting layer formed on the dimpled surface of the resin layer, at least a part of the reflection relief hologram being formed as a transferable region; transferring a predetermined portion of the transferable region to the surface of an object to which information is to be transferred; and heating at least a part of the transferred portion with a heating means, thereby destroying the reflecting layer.

The first invention also provides an information recording method comprising the steps of: preparing a transfer foil having a reflection relief hologram comprising at least a resin layer having a fine dimple pattern, e.g., a relief hologram, a relief diffraction grating, etc., formed on the surface thereof, and a reflecting layer formed on the dimpled surface of the resin layer, at least a part of the reflection relief hologram being formed as a transferable region; transferring a predetermined portion of the transferable region to the surface of an object to which information is to be transferred; and heating at least a part of the transferred portion with a heating means, thereby smoothing a dimple pattern formed by the surface of the resin layer and the reflecting layer.

The first invention also includes an information recording medium which has information recorded thereon by either of the above-described methods.

To attain the second object, the second invention provides a reflection relief hologram transfer foil comprising at least: a resin layer having a fine dimple pattern, e.g., a relief hologram, a relief diffraction grating, etc., formed on the surface thereof; a reflecting layer formed on the dimpled surface of the resin layer; and a releasable base film stacked on the side of the resin layer which is opposite to the side thereof where the reflecting layer is provided.

In this arrangement, a protective resin layer may be coated on the side of the reflecting layer which is opposite to the side thereof where the resin layer is provided.

The invention also provides a method of selectively transferring a reflection relief hologram in a desired select pattern to the surface of a substrate where information is to be transferred by using the above-described reflection relief hologram transfer foil, comprising the steps of: selectively coating an adhesive on a select pattern region of the surface of the substrate or the surface of the reflecting layer or the protective resin layer of the transfer foil; laying the transfer foil and the substrate one on top of the other in such a manner that the reflecting layer or the protective resin layer of the transfer foil faces the surface of the substrate; and peeling off the base film after the transfer foil and the substrate have been bonded together, thereby selectively transferring the reflection relief hologram only to the adhesive coating region.

In addition, the invention provides a method of selectively transferring a reflection relief hologram in a desired select pattern to the surface of a substrate where information is to be transferred by using the above-described reflection relief hologram transfer foil, comprising the steps of: coating an adhesive on the whole area of either the surface of the substrate or the surface of the reflecting layer or the protective resin layer of the transfer foil; selectively coating an ink on a select pattern region of the other surface; laying the transfer foil and the substrate one on top of the other in such a manner that the reflecting layer or the protective resin layer of the transfer foil faces the surface of the substrate; and peeling off the base film after the transfer foil and the substrate have been bonded together, thereby selectively transferring the reflection relief hologram only to the ink coating region.

In addition, the invention provides a method of selectively transferring a reflection relief hologram in a desired select pattern to the surface of a substrate where information is to be transferred by using the above-described reflection relief hologram transfer foil, comprising the steps of: coating an adhesive on the whole area of either the surface of the substrate or the surface of the reflecting layer or the protective resin layer of the transfer foil; selectively coating an ink on either a select pattern region of the surface coated with the adhesive or a select pattern region of the other surface; laying the transfer foil and the substrate one on top of the other in such a manner that the reflecting layer or the protective resin layer of the transfer foil faces the surface of the substrate; and peeling off the base film after the transfer foil and the substrate have been bonded together, thereby selectively transferring the reflection relief hologram only to the region where no ink is coated.

The adhesive is a time-dependent adhesive, a heat-sensitive adhesive, a pressure-sensitive adhesive, or a toner.

The above-described method wherein an adhesive is selectively coated on a select pattern region of the surface of the substrate or the surface of the reflecting layer or the protective resin layer of the transfer foil; the transfer foil and the substrate are laid one on top of the other in such a manner that the reflecting layer or the protective resin layer of the transfer foil faces the surface of the substrate; and the base film is peeled off after the transfer foil and the substrate have been bonded together, thereby selectively transferring the reflection relief hologram only to the adhesive coating region, may be modified such that an ink that is compatible with a thermoplastic adhesive resin is selectively coated on a select pattern region of either the surface of the substrate or the surface of the reflecting layer or the protective resin layer of the transfer foil; the ink coating surface is sprinkled with a thermoplastic adhesive resin powder before the ink pattern dries; the thermoplastic adhesive resin powder that is not bonded to the ink pattern is shaken off, thereby distributing the powder only over the desired pattern portion; and after the ink has dried, the transfer foil and the substrate are laid one on top of the other in such a manner that the reflecting layer or the protective resin layer of the transfer foil faces the surface of the substrate.

In addition, the invention provides a method of selectively transferring a reflection relief hologram in a desired select pattern to the surface of a substrate where information is to be transferred by using the above-described reflection relief hologram transfer foil, comprising the steps of: selectively coating a reactivated adhesive on a select pattern region of either the surface of the substrate or the surface of the reflecting layer or the protective resin layer of the transfer foil and drying the adhesive; coating either the reactivated adhesive coating surface or the other surface with a solvent for the reactivated adhesive or an ink containing the solvent; laying the transfer foil and the substrate one on top of the other in such a manner that the reflecting layer or the protective resin layer of the transfer foil faces the surface of the substrate; and peeling off the base film after the reactivated adhesive has solidified, thereby selectively transferring the reflection relief hologram only to the reactivated adhesive coating region.

In addition, the invention provides a method of selectively transferring a reflection relief hologram in a desired select pattern to the surface of a substrate where information is to be transferred by using the above-described reflection relief hologram transfer foil, comprising the steps of: coating a reactivated adhesive on the whole area of either the surface of the substrate or the surface of the reflecting layer or the protective resin layer of the transfer foil and drying the adhesive; selectively coating either a select pattern region of the reactivated adhesive coating surface or a select pattern region of the other surface with a solvent for the reactivated adhesive or an ink containing the solvent; laying, before the solvent or the ink dries, the transfer foil and the substrate one on top of the other in such a manner that the reflecting layer or the protective resin layer of the transfer foil faces the surface of the substrate; and peeling off the base film after the reactivated adhesive has solidified, thereby selectively transferring the reflection relief hologram only to the solvent coating region.

To attain the third object, the third invention provides a fine dimple pattern transfer foil comprising a releasable base film, a resin layer, a reflecting layer, and a heat-sensitive adhesive layer, which are stacked in the mentioned order, and having a fine dimple pattern formed on the surface of the resin layer on the side thereof where the reflecting layer is provided, wherein the peel strength between the releasable base film and the resin layer is 1 g/inch to 5 g/inch, and the peel strength is larger than the film breaking strength of the resin layer.

Preferably, the initial bond strength of the heat-sensitive adhesive layer is larger than the peel strength between the releasable base film and the resin layer, and the welding temperature of the heat-sensitive adhesive layer is lower than the glass transition temperature of the resin layer. More preferably, the thickness of the transfer foil is not larger than 15 μm. If the fine dimple pattern is formed as an interference fringe relief pattern, a reflection relief hologram transfer foil is obtained.

The invention also provides a method of producing a transfer foil comprising a releasable base film, a resin layer, a reflecting layer, and a heat-sensitive adhesive layer, which are stacked in the mentioned order, and having a fine dimple pattern formed on the surface of the resin layer on the side thereof where the reflecting layer is provided, the method comprising the steps of: preparing a laminate comprising a releasable base film, a resin layer and a reflecting layer, which are stacked in the mentioned order; and press-embossing a dimpled surface of a stamper having a fine dimple pattern recorded thereon on the reflecting layer side of the laminate at high temperature and high pressure, thereby transferring the fine dimple pattern to both the reflecting layer and the resin layer.

Preferably, the press embossing is carried out by using a resin layer material that satisfies the following condition:

$$T_g \leq T_e << T_s$$

where $T_g$ is the glass transition temperature of the resin layer, $T_s$ the softening temperature of the resin layer, and $T_e$ the press embossing temperature.

Preferably, the press embossing is carried out with a metallic stamper, and the press pressure in the case of a roll press is 10 kg/cm to 200 kg/cm in terms of linear pressure, while in the case of a flat press the pressure is 50 kg/cm² to 1,000 kg/cm². It is also preferable that the press embossing should be carried out with a stamper having a hardness of Hv 200 to Hv 600 in terms of Vickers hardness.

According to the first invention, it is possible to add information, e.g., an image or a character, other than information originally recorded on a reflection relief hologram by preparing a transfer foil having a reflection relief hologram comprising a resin layer and a reflecting layer, at least a part of the reflection relief hologram being formed as a transferable region, transferring a predetermined portion of the transferable region to the surface of an object to which information is to be transferred, and heating at least a part of the transferred portion with a heating means, thereby destroying the reflecting layer, or smoothing a dimple pattern formed by the surface of the resin layer and the reflecting layer. Thus, it is possible to diversify the recording and display forms of hologram transfer foils.

According to the second invention, the reflection relief hologram transfer foil comprises at least a resin layer having a fine dimple pattern, e.g., a relief hologram, a relief diffraction grating, etc., formed on the surface thereof, a reflecting layer formed on the dimpled surface of the resin layer, a releasable base film stacked on the side of the resin layer which is opposite to the side thereof where the reflecting layer is provided, and an adhesive or the like is selectively coated on a select pattern region of the surface of a substrate to which information is to be transferred, or of the surface of the reflecting layer or a protective resin layer of the transfer foil, thereby selectively transferring the reflection relief hologram only to the adhesive coating region. Accordingly, a fine transfer hologram pattern can be readily formed over a large area.

According to the fine dimple pattern transfer foil having a reflecting layer of the third invention, the peel strength between the releasable base film and the resin layer is 1 g/inch to 5 g/inch and set to be larger than the film breaking strength of the resin layer. Therefore, a fine dimple pattern can be thermally transferred precisely even with weak adhesive force, with excellent foil breaking characteristics and without chipping or tailing.

According to the method of producing a transfer foil of the third invention, a laminate comprising a releasable base film, a resin layer, and a reflecting layer, which are stacked in the mentioned order, is prepared, and a dimpled surface of a stamper having a fine dimple pattern recorded thereon is press-embossed on the reflecting layer side of the laminate at high temperature and high pressure, thereby transferring the fine dimple pattern to both the reflecting layer and the resin layer. Accordingly, the fine dimple pattern can be duplicated faithfully without being deformed again and without the need for a deposition process, a cooling process, etc. In addition, it is possible to readily produce a transfer foil which enables a fine dimple pattern to be thermally transferred precisely with excellent release characteristics and superior foil breaking characteristics.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Embodiments of the first to third inventions of this application will be described below with reference to the accompanying drawings.

Figure 1A:
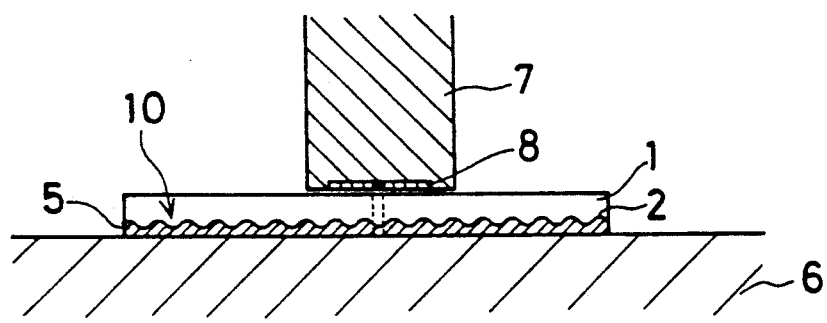
FIGS. 1(a) and 1(b) illustrate the information recording method according to the first invention.
Figure 1B:
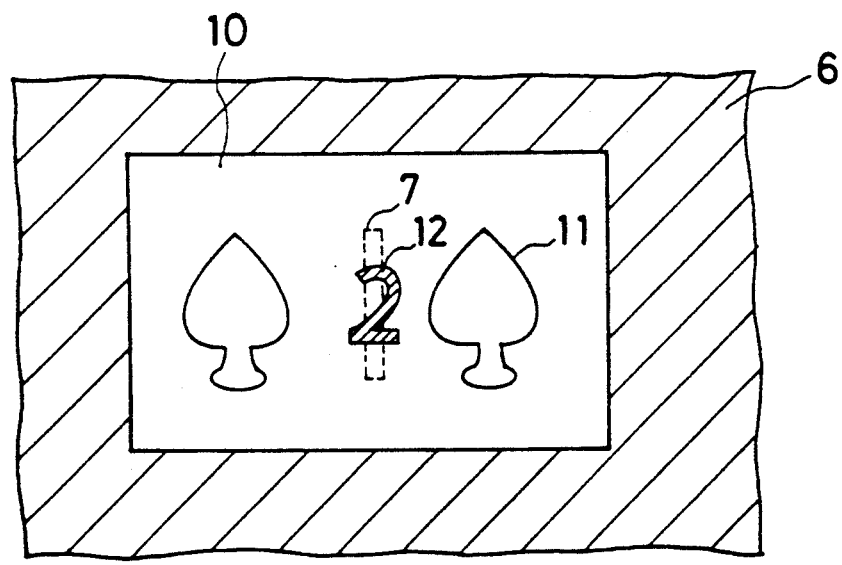

First, the information recording method of the first invention will be explained with reference to FIG. 1. FIG. 1(a) shows a reflection relief hologram 10 transferred to the surface of a substrate 6. A hologram with a desired profile, which comprises a hologram layer 1 and a reflecting layer 2, is bonded to the surface of the substrate 6 by a heat-sensitive adhesive layer 5, as described above, and has image information 11 recorded thereon, as shown in the plan view of FIG. 1(b). With a thermal recording head 7 pressed against such a transferred hologram region again, desired ones of the heating elements 8 are driven. In consequence, respective portions of the hologram layer 1 and the reflecting layer 2 which correspond to the driven heating elements 8 are heated rapidly. By the heating, the metal or other material constituting the thin reflecting layer 2 is melted and then cracks finely because of surface tension, thus losing its reflecting properties. As a result, this portion of the substrate 6 can be seen through the reflecting layer 2. Accordingly, if the substrate 1 is colored in advance, for example, and the heating elements 8 are selectively driven sequentially on the basis of information desired to record, information 12, for example, a character or an image, can be recorded and displayed in addition to the information 11 originally recorded on the hologram.

The heating means is not necessarily limited to a thermal recording head such as that described above. For example, a hot stamper, laser light, infrared light, electric discharge, etc. may be employed as a heating means. In the case of a hot stamper, the stamper is pressed against a transferred hologram region to destroy the reflecting layer 2 in the corresponding region to thereby record information in the same way as in the case of FIG. 1, whereas in the case of a beam of laser light or infrared light, the beam is focused on a portion of the transferred hologram region where information is desired to record. In the case of an electric discharge, it is only necessary to apply an electric discharge to a selected region. It should be noted that the reflecting layer 2 is selectively evaporated and information is thus recorded when the heat temperature applied by the heating means is high, or depending upon the material or thickness of the reflecting layer 2. Even if the reflecting layer 2 is not destroyed, the dimpled surfaces of the hologram layer 1 and the reflecting layer 2 return to the flat surfaces because of melt softening and the hologram in a selected region is erased, so that the selected region becomes different in contrast, color, etc. from the other region, thus enabling information to be recorded and displayed in the same way.

The following is a description of a material for each of the layers of the reflection relief hologram arranged in the form of a transfer foil and an embossing method employed. As a material for the base film 4, biaxially oriented polyethylene terephthalate film is most preferable from the viewpoint of dimensional stability, heat resistance, toughness, etc. Other materials usable for the base film 4 are synthetic films such as polyvinyl chloride film, polypropylene film, polyethylene film, polycarbonate film, cellophane, Vinylon (trademark) film, acetate film, nylon film, polyvinyl alcohol film, polyamide film, polyamide-imide film, etc., and paper such as condenser paper. The thickness of the base film 4 is preferably of the order of 6 $\mu$m to 12 $\mu$m.

The release layer 3 is provided for the purpose of improving release characteristics and foil breaking characteristics. For the release layer 3, various known materials can be used in accordance with the kind of the base film 4, for example, polymethacrylate resin, polyvinyl chloride resin, cellulose resin, silicone resin, wax containing hydrocarbon as a principal component, polystyrene resin, chlorinated rubber, casein, various kinds of surface-active agent, metallic oxides, etc. These materials can be used alone or in the form of a mixture of two or more so that the peel strength of the release layer 3 is 1 g/inch to 5 g/inch (peeling at 90 degrees) in combination with the base film 4.

With these materials, the release layer 3 may be formed as a thin film on the base film 4 by a known method, for example, by coating the material in the form of ink. The thickness of the release layer 3 is preferably in the range of from 0.1 $\mu$m to 1.0 $\mu$m when the peel strength and foil breaking characteristics are taken into consideration.

For the hologram layer 1, various kinds of resin material can be selected with the foil breaking characteristics and transfer heat resistance taken into consideration. Specific examples of materials usable for the hologram layer 1 are unsaturated polyester resin, acryl urethane resin, epoxy modified acrylic resin, epoxy modified unsaturated polyester resin, acrylic ester resin, acrylamide resin, nitrocellulose resin, polystyrene resin, alkyd resin, phenolic resin, etc. These materials may be used alone or in the form of a mixture of two or more. It is also possible to add to these materials a proper amount of a heat- or ultraviolet- curing agent selected from among isocyanate resins, metallic soaps such as cobalt naphthenate and lead naphthenate, peroxides such as benzoyl peroxide and methyl ethyl ketone peroxide, benzophenone, acetophenone, anthraquinone, naphthoquinone, azobisisobutyronitrile, diphenyl sulfide, etc.

These materials are blended together so that the glass transition temperature is higher than the heat temperature applied during the heat transfer process. Specifically, it is preferable that the glass transition temperature should be 100° C. to 200° C.

The hologram resin layer 1 can be formed by coating the material in the form of ink according to a known method. When it is considered that the foil breaking characteristics (film breaking strength) should be set in the range of from 0.5 g/inch to 1.0 g/inch, the thickness of the hologram resin layer 1 is preferably in the range of from 0.5 $\mu$m to 2.0 $\mu$m.

A reflective thin film layer for forming the reflecting layer 2 is provided on the surface of the hologram resin layer 1 by deposition, sputtering, ion plating, electrolytic plating, electroless plating, etc. using a metal, a metallic compound, glass, etc.

In the case of a reflection hologram, a metal thin film that reflects light is employed as the reflective thin film layer 2, whereas in the case of a transparent hologram, a holographic effect thin film is employed which exhibits holographic effect in combination with the resin layer 1 and which does not conceal the underlying layer. Thus, the reflective thin film may be properly selected according to the purpose.

Specific examples of metal thin films usable for a reflection hologram are metals such as Cr, Ti, Fe, Co, Ni, Cu, Ag, Au, Ge, Al, Mg, Sb, Pb, Pd, Cd, Bi, Sn, Se, In, Ga, Rb, etc., and oxides and nitrides of these metals. These materials may be used alone or a combination of two or more. Among the above-mentioned metals, Al, Cr, Ni, Ag and Au are particularly preferable. The film thickness is preferably 10 Å to 10,000 Å, more preferably 200 Å to 2,000 Å.

The holographic effect thin film that is employed for a transparent hologram may be made of any material as long as it transmits light so that the holographic effect can be exhibited. Examples of such material include a transparent material which is different in refractive index from the resin layer 1, and a reflective metal thin film layer having a thickness of not larger than 200 Å.

In the case of the former, the refractive index may be either larger or smaller than that of the resin layer 1, but the refractive index difference is preferably 0.1 or more, more preferably 0.5 or more. According to an experiment carried out by the present inventors, a refractive index difference of 1.0 or more is the most suitable. By providing a transparent thin film layer 2 that is different in refractive index from the resin layer 1, the required holographic effect can be exhibited and, at the same time, the underlying layer can be seen through the layer 2.

In the case of the latter, although it is a reflective metal film layer, since the thickness is not larger than 200 Å, the light wave transmission factor is large, so that the required holographic effect can be exhibited and, at the same time, the underlying layer can be seen through the layer 2. By setting the film thickness at 200 Å or less, the incongruity in the appearance that has heretofore been given by silver gray of high brightness is eliminated.

Examples of materials usable for the thin film layer 2 include those described below (1) to (6).

(1) Transparent continuous thin films having a larger refractive index than that of the resin layer 1:

This type of thin film include those which are transparent in the visible region and those which are transparent in either the infrared or ultraviolet region. The former materials are shown in Table 1 below, and the latter materials in Table 2 below. In Tables n denotes refractive index (the same is the case with the materials (2) to (5)).

TABLE 1

| Materials which are transparent in the visible region | | | |
|---|---|---|---|
| Materials | n | Materials | n |
| $Sb_2S_3$ | 3.0 | SiO | 2.0 |
| $Fe_2O_3$ | 2.7 | $InO_3$ | 2.0 |
| PbO | 2.6 | $Y_2O_3$ | 1.9 |
| ZnSe | 2.6 | TiO | 1.9 |
| CdS | 2.6 | $ThO_2$ | 1.9 |
| $Bi_2O_3$ | 2.4 | $Si_2O_3$ | 1.9 |
| $TiO_2$ | 2.3 | $PbF_2$ | 1.8 |
| $PbCl_2$ | 2.3 | $Cd_2O_3$ | 1.8 |
| $Cr_2O_3$ | 2.3 | MgO | 1.7 |
| $CeO_2$ | 2.2 | $Al_2O_3$ | 1.6 |
| $Ta_2O_5$ | 2.2 | $LaF_3$ | 1.6 |
| ZnS | 2.2 | $CeF_2$ | 1.6 |
| ZnO | 2.1 | $NdF_3$ | 1.6 |
| CdO | 2.1 | $SiO_2$ | 1.5 |
| $Nd_2O_3$ | 2.1 | $SiO_3$ | 1.5 |
| $Sb_2O_3$ | 2.0 | | |

TABLE 2

| Materials which are transparent in either the infrared or ultraviolet region | |
|---|---|
| Materials | n |
| CdSe | 3.5 |
| CdTe | 2.6 |
| Ge | 4.0 to 4.4 |
| $HfO_2$ | 2.2 |
| PbTe | 5.6 |
| Si | 3.4 |
| Te | 4.9 |
| TlCl | 2.6 |
| ZnTe | 2.8 |

(2) Transparent ferroelectric materials having a larger refractive index than that of the resin layer 1 are shown in Table 3 below.

TABLE 3

| Materials | n |
|---|---|
| CuCl | 2.0 |
| CuBr | 2.2 |
| GaAs | 3.3 to 3.6 |
| GaP | 3.3 to 3.5 |
| $N_4(CH_2)_6$ | 1.6 |
| $Bi_4(GeO_4)_3$ | 2.1 |
| $KH_2PO_4$ (KDP) | 1.5 |
| $KD_2PO_4$ | 1.5 |
| $NH_4H_2PO_4$ | 1.5 |
| $KH_2AsO_4$ | 1.6 |
| $RbH_2AsO_4$ | 1.6 |
| $KTa_{0.65}Nb_{0.35}O_3$ | 2.3 |
| $K_{0.6}Li_{0.4}NbO_3$ | 2.3 |
| $KSr_2Nb_5O_{15}$ | 2.3 |
| $Sr_xBa_{1-x}Nb_2O_6$ | 2.3 |
| $Ba_2NaNbO_{15}$ | 2.3 |
| $LiNbO_3$ | 2.3 |
| $LiTaO_3$ | 2.2 |
| $BaTiO_3$ | 2.4 |
| $SrTiO_3$ | 2.4 |
| $KTaO_3$ | 2.2 |

(3) Transparent continuous thin films have a smaller refractive index than that of the resin layer 1 are shown in Table 4 below.

TABLE 4

| Materials | n |
|---|---|
| LiF | 1.4 |
| $MgF_2$ | 1.4 |
| $3NaF.AlF_3$ | 1.4 |
| $AlF_3$ | 1.4 |
| NaF | 1.3 |
| $GaF_2$ | 1.3 |

(4) Reflective metal thin films having a thickness of not larger than 200 Å.

Reflective metal thin films have a complex index of refraction, which is expressed by $n = n - iK$, where n is refractive index, and K is absorption coefficient. Materials of reflective metal thin film layers usable in the first invention are shown in Table 5 below, together with n and K.

TABLE 5

| Materials | n | K |
|---|---|---|
| Be | 2.7 | 0.9 |
| Mg | 0.6 | 6.1 |
| Ca | 0.3 | 8.1 |
| Cr | 3.3 | 1.3 |
| Mn | 2.5 | 1.3 |
| Cu | 0.7 | 2.4 |
| Ag | 0.1 | 3.3 |
| Al | 0.8 | 5.3 |
| Sb | 3.0 | 1.6 |
| Pd | 1.9 | 1.3 |
| Ni | 1.8 | 1.8 |
| Sr | 0.6 | 3.2 |
| Ba | 0.9 | 1.7 |
| La | 1.8 | 1.9 |
| Ce | 1.7 | 1.4 |
| Au | 0.3 | 2.4 |

It is also possible to use other materials such as Sn, In, Te, Fe, Co, Zn, Ge, Pb, Cd, Bi, Se, Ga, Rb, etc. In addition, oxides and nitrides of the above-mentioned metals can be used alone or a combination of two or more.

(5) Resins which are different in refractive index from the resin layer 1:

The refractive index of these resins may be either larger or smaller than that of the resin layer 1. Examples of such resins are shown in Table 6 below.

TABLE 6

| Resins | n |
|---|---|
| Polytetrafluoroethylene | 1.35 |
| Polychlorotrifluoroethylene | 1.43 |
| Vinyl acetate resin | 1.46 |
| Polyethylene | 1.52 |
| Polypropylene | 1.49 |
| Methyl methacrylate | 1.49 |
| Nylon | 1.53 |
| Polystyrene | 1.60 |
| Polyvinylidene chloride | 1.62 |
| Vinyl butyral resin | 1.48 |
| Vinyl formal resin | 1.50 |
| Polyvinyl chloride | 1.53 |
| Polyester resin | 1.55 |
| Phenol-formalin resin | 1.60 |

It is possible to use ordinary synthetic resins in addition to the above, and it is particularly preferable to use a resin which is largely different in refractive index from the resin layer 1.

(6) Laminates obtained by properly combining the materials (1) to (5):

The materials (1) to (5) may be combined with each other as desired, and the positional relationship between the layers of a laminate may be selected as desired.

Of the thin film layers (1) to (6), the thin film layer (4) has a thickness of not larger than 200 Å, whereas the thickness of the thin film layers (1) to (3), (5) and (6) may be determined as desired as long as the material forming the thin film is transparent in the relevant spectral region; in general, the thickness is preferably 10 Å to 10,000 Å, more preferably 100 Å to 5,000 Å.

When the thin film layer 2 is made of any of the materials (1) to (4), the holographic effect layer 2 can be formed on the resin layer 1 by using a conventional thin film forming means, e.g., vacuum deposition, sputtering, reactive sputtering, ion plating, electrolytic plating, etc., whereas, when the thin film layer 2 is made of the material (5), a conventional coating method can be employed. When the thin film layer 2 is made of the material (6), the above-mentioned means and methods may be properly combined together.

In the first invention, the thickness of the holographic effect layer 2 is preferably 100 Å to 600 Å, in general. If the thickness is less than 100 Å, the reflecting effect becomes inadequate, whereas, if the thickness exceeds 600 Å, the embossing characteristics lower considerably.

A stamper for embossing such a transfer foil can be produced by a known method. However, the stamper needs high pressure resistance and satisfactorily high hardness and tensile strength because a fine dimple pattern on the surface thereof must be pressed into the mating substrate completely. For this reason, it is most suitable to obtain a stamper by electrolytic Ni plating method.

The emboss substrate (comprising the base film 4, the release layer 3, the hologram layer 1 and the reflecting layer 2) and the stamper, which are obtained as described above, are put one on top of the other in such a manner that the reflecting layer 2 of the substrate film and the dimpled surface of the stamper are brought into contact with each other, and are then heat-pressed, thereby transferring the dimple pattern to both the reflecting layer 2 and the resin layer 1. Thereafter, a heat-sensitive adhesive layer 5 of a vinyl chloride resin or the like is provided on the reflecting layer 2 to complete a transfer foil.

EXAMPLE 1

A release layer of wax with a peel strength of 5 g/inch was provided to a thickness of 0.5 μm on the surface of a base film of PET having a thickness of 12 μm, and a hologram layer of acryl urethane resin with a thickness of 1.0 μm was coated on the release layer. Further, aluminum was evaporated to a thickness of 300 Å on the hologram layer to obtain a laminate for duplicate. A relief hologram stamper formed by nickel plating was pressed under heating against the reflecting layer side of the laminate to make a duplicate of the relief hologram. Thereafter, a heat-sensitive adhesive layer of a vinyl chloride-acetate resin was coated to a thickness of 3 μm on the duplicate side of the laminate and then dried to thereby produce a reflection relief hologram transfer foil.

Then, the hologram transfer foil obtained in this way was laid on a PET film (188 μm) coated at the surface thereof with a vinyl chloride-acetate resin, and heat transfer was effected at 0.6 mJ/dot by using a thin-film thermal head (8 dots/mm).

The transfer printed section thus obtained was superior in the foil breaking characteristics, adhesion, etc., and all the dots were resolved.

The transfer printed section with the above-described contents was heated again at 1.0 mJ/dot with the thermal head. In consequence, the release layer, the resin layer and the reflecting layer in the reheated portion were melted and destroyed, and the reflecting layer disappeared in the reheated pattern.

When the reheating was carried out with a printing energy of 0.2 mJ/dot, the reflecting layer was not melted, but the hologram pattern alone disappeared.

Figure 11:
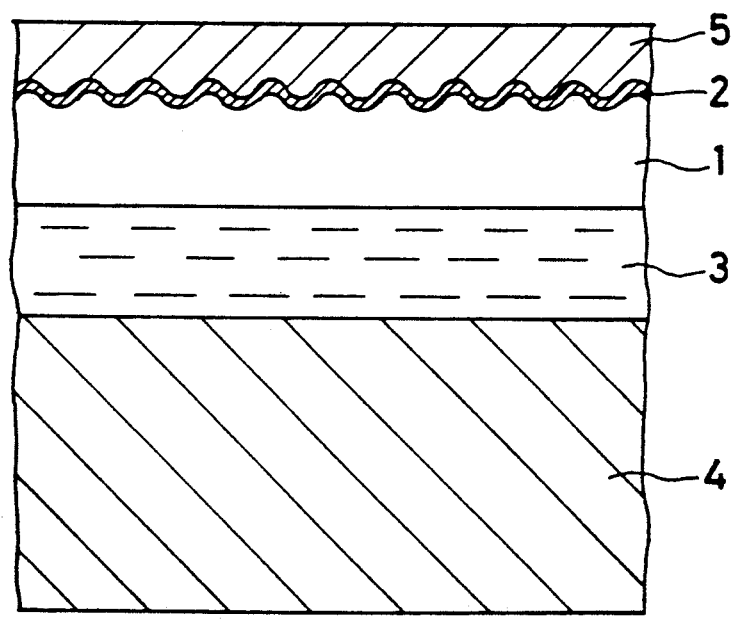
FIG. 11 shows a sectional structure of the reflection relief hologram shown in FIG. 10, which is arranged in the form of a transfer foil.
Figure 12:
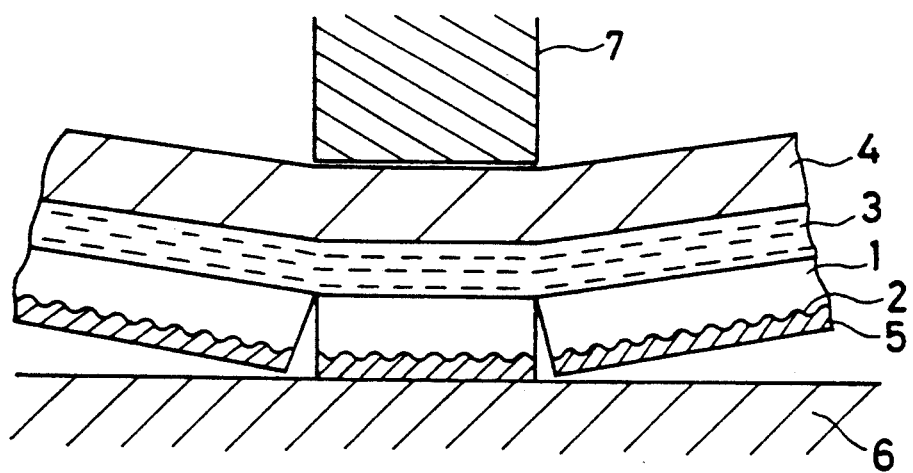
FIG. 12 illustrates the way in which the transfer foil shown in FIG. 11 is transferred by using a thermal recording head.

Next, the reflection relief hologram transfer foil of the second invention will be explained with reference to FIGS. 2 and 3. A transfer foil 30 shown in FIG. 2 differs from the conventional transfer foil shown in FIG. 11 only in that no heat-sensitive adhesive layer 5 is provided on the transfer foil 30. More specifically, the transfer foil 30 has a reflection relief hologram comprising a hologram layer 21 made of a thermoplastic transparent resin or the like and a reflecting layer 22 of a deposited metal film, e.g., aluminum, tin, etc., or a high-refractive index transparent film, e.g., zinc sulfide, which is formed on a dimpled interference fringe surface (relief surface) defined by the surface of the hologram layer 21. The transfer foil 30 further has a base film 24 of PET (polyethylene terephthalate) provided at the side of the hologram layer 21 which is opposite to the side thereof where the reflecting layer 22 is provided, through a release layer 23 made of wax or the like. In this case, the reflecting layer 22 is exposed. A protective resin layer may be provided on the reflecting layer 22, as shown in FIG. 3, for the purpose of protecting the exposed reflecting layer 22.

With the transfer foil 30, the reflection relief hologram is transferred to a desired substrate 26 in a desired pattern as follows. First, a solventless, time-dependent adhesive 29 which sets with time as a chemical reaction proceeds, e.g., epoxy urethane, is coated on the substrate 26 in a desired pattern by a desired printing method, e.g., stencil printing, screen process printing, mimeograph, etc., or handwriting, as shown in FIG. 4(a). Before the adhesive 29 sets, the transfer foil 30 shown in FIG. 2 or 3 is laid on the substrate 26 in such a manner that the reflecting layer 22 is in close contact with the printed surface, and after the adhesive 29 has set, the base film 24 is peeled off. As a result, the reflection relief hologram is selectively transferred only to the printed portions. Accordingly, the size of the pattern transferred is determined by the printed pattern of the adhesive 29, and it does not depend on the size of heating elements of the thermal recording head used, as in the prior art. In addition, since the adhesive 29 can be printed over a wide area with ease, the area where transfer can be effected is not limited as long as the size of the transfer foil 30 is adequately large.

A heat-sensitive adhesive may be employed in place of the above-described adhesive 29. More specifically, a heat-sensitive adhesive 29 is coated on the substrate 26 in the same way as the above, and the transfer foil 30 is laid on the substrate 26. Then, the transfer foil 30 is heated from the base film (24) side with a heating means such as an iron, and after the adhesive 29 has set, the base film 24 is peeled off. In this case also, a fine hologram pattern can be transferred over a large area independently of the size of heating elements of a thermal recording head in the same way as the above.

Although in the foregoing the heat-sensitive adhesive is distributed in a desired pattern by selectively coating it by a desired printing method or handwriting, the adhesive coating process may be as follows: An ink that is compatible with a thermoplastic adhesive resin is previously coated on the substrate 26 in a desired pattern by a desired printing method or handwriting. Before the ink pattern dries, a thermoplastic adhesive resin powder is sprinkled on the substrate 26, and the powder that is not bonded to the ink pattern is shaken off, thereby distributing the thermoplastic adhesive resin powder 29 only over the desired pattern portion. After the ink has dried, the transfer foil 30 is laid on the substrate 26 and heated from the base film (24) side with a heating means such as an iron in the same way as the above, and after the thermoplastic adhesive resin portions 29 have set, the base film 24 is peeled off.

Figure 2:
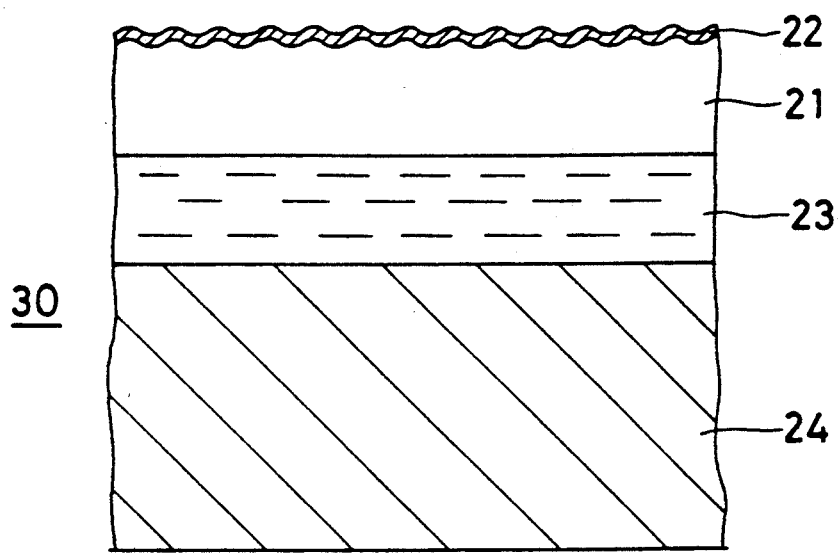
FIG. 2 is a sectional view of one embodiment of the reflection relief hologram transfer foil according to the second invention.
Figure 3:
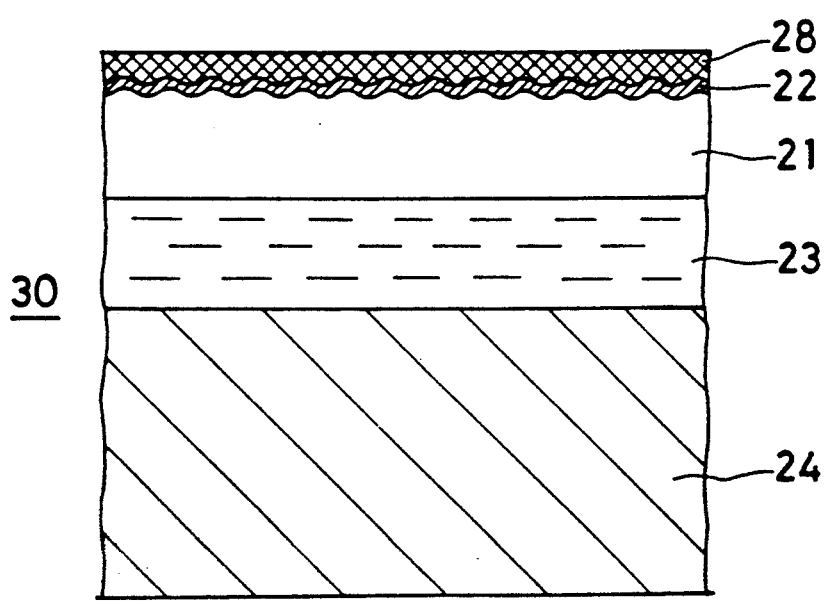
FIG. 3 is a sectional view of another embodiment of the transfer foil according to the second invention.
Figure 4A:
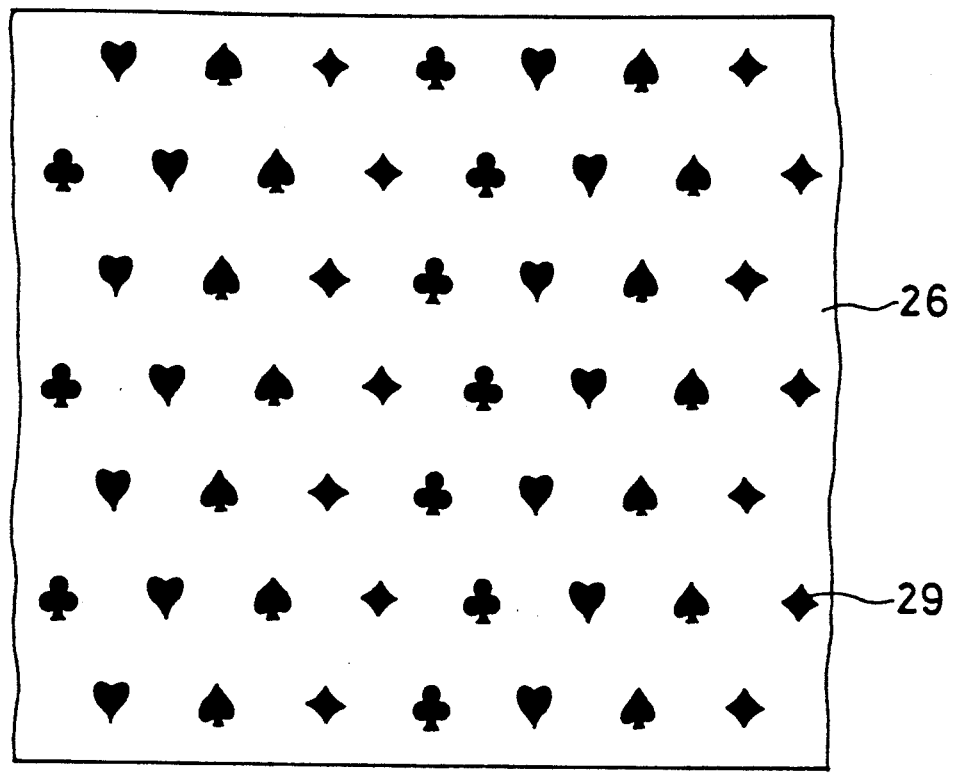
FIGS. 4(a) and 4(b) illustrate one embodiment of the method of selectively transferring a reflection relief hologram according to the second invention.

It is also possible to transfer a fine hologram pattern over a large area by a method wherein a heat-sensitive adhesive is coated on the whole surface of the reflecting layer (22) side of the transfer foil 30 shown in FIG. 2 or 3, while a desired pattern is drawn on the substrate 26 by a desired printing method or handwriting using a ink that is compatible with the heat-sensitive adhesive, and the transfer foil 30 is laid on the substrate 26 and heated from the base film (24) side with a heating means such as an iron in the same way as the above, and after the adhesive 29 has set, the base film 24 is peeled off. In a case where the substrate 26 itself is compatible with the heat-sensitive adhesive, a negative pattern is formed on the transfer foil 30 by using an ink that is releasable with respect to the heat sensitive adhesive, and the transfer foil 30 is laid on the substrate 26 and heated from the base film (24) side with a heating means, thereby enabling the reflection relief hologram to be transferred only to portions (positive pattern) where the heat-sensitive adhesive is exposed.

In general, electrophotographic copy machines of the type that a toner image is transferred to plain paper employ a heat-sensitive fixing type toner, which is formed by dispersing pigment particles into a heat-sensitive resin or coating pigment particles with a heat-sensitive resin. Therefore, the toner image that is transferred and fixed to plain paper has heat-sensitive adhesive properties. Accordingly, if the transfer foil 30 is laid on a pattern formed by transferring and fixing a heat-sensitive fixing type toner and heated from the base film (24) side with a heating means such as an iron, either the reflecting layer 22 or the protective resin layer 28 is bonded to the pattern region. Therefore, if the base film 4 is peeled off after the heat-sensitive resin has set, the reflection relief hologram is selectively transferred only to the toner pattern portion. In this case, it is only necessary to make a copy of an original which is painted black in a pattern to which a hologram is desired to transfer by using an electrophotographic copy machine and then transfer the hologram to the copy with the transfer foil 30 laid thereon. In this way, the reflection relief hologram can be transferred to a select region in the form of a fine pattern extremely easily.

Although in the foregoing the present invention has been described in regard to processes wherein a coating pattern of a solventless, time-dependent adhesive or a heat-sensitive adhesive, a coating pattern of a thermoplastic adhesive resin powder, a coating pattern of an ink that is compatible with a heat-sensitive adhesive, or a transferred and fixed image of a heat-sensitive fixing type toner is formed on an object to which a reflection relief hologram is to be transferred, it is also possible to transfer a reflection relief hologram selectively as in the above by selectively forming such a pattern or toner image on the surface of either the reflecting layer 22 or the protective resin layer 28 of the transfer foil 30.

Figure 4B:
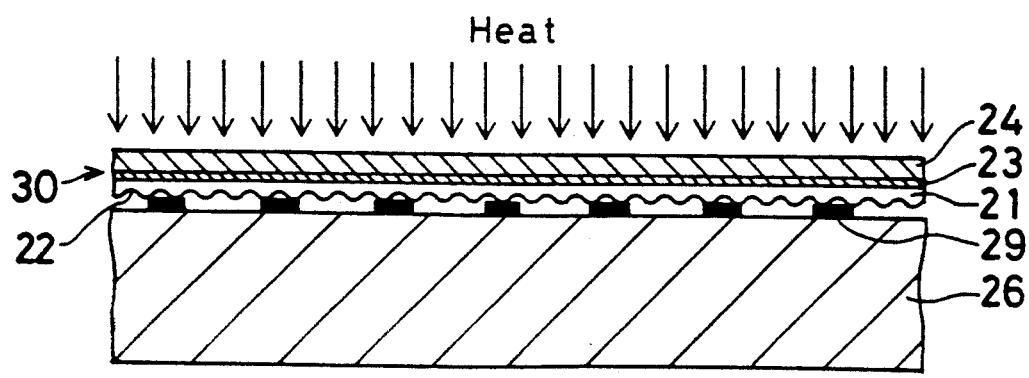

In addition, a pressure-sensitive adhesive or a reactivated adhesive may be employed in place of the heat-sensitive adhesive. In the case of a pressure-sensitive adhesive, in the process shown in FIG. 4(b) the transfer foil 30 is laid on the pressure-sensitive adhesive coating pattern and pressed from the base film (24) side with a pressing means instead of heating, thereby transferring the reflection relief hologram only to portions where the pressure-sensitive adhesive has been coated. It is also possible to transfer the reflection relief hologram by coating a pressure-sensitive adhesive on the whole surface of the reflecting layer (22) side of the transfer foil 30, putting the coated surface of the transfer foil 30 on the surface of the substrate 26 printed with an ink that is compatible with the pressure-sensitive adhesive, pressing the transfer foil 30, and peeling off the base film 24 after the transfer foil 30 and the substrate 26 have been bonded together, in the same way as in the case of the heat-sensitive adhesive. Further, it is also possible to transfer the reflection relief hologram by uniformly coating a pressure-sensitive adhesive over the substrate 26, printing a desired pattern on the pressure-sensitive adhesive so as to form a mask with an ink, laying the transfer foil 30 on the printed side of the substrate 26, and pressing the transfer foil 30 from the base film (24) side with a pressing means, thereby transferring the reflection relief hologram only to portions where the pressure-sensitive adhesive is exposed. In a case where the substrate 26 itself is compatible with the pressure-sensitive adhesive, a negative pattern is formed on the transfer foil 30 by using an ink that is releasable with respect to the pressure-sensitive adhesive, and the transfer foil 30 is laid on the substrate 26 and heated from the base film (24) side with a pressing means, thereby enabling the reflection relief hologram to be transferred only to portions (positive pattern) where the pressure-sensitive adhesive is exposed.

In the case of a reactivated adhesive (an adhesive material which becomes adhesive when rewetted with a solvent after it has once dried), a solution, for example, water, is coated on the whole area of the reactivated adhesive coating pattern, and the transfer foil 30 is laid thereon, and after the adhesive has dried, the base film 24 is peeled off. The process may be such that a reactivated adhesive is coated on the whole surface of the transfer foil 30 in advance, and a desired pattern is printed on the substrate 26 with an aqueous solution or a water-soluble ink. Before the printed portions dry, the surface of the transfer foil 30 which is coated with the reactivated adhesive is laid on the printed surface of the substrate 26, and after the adhesive has dried, the base film 24 is peeled off.

In the case of a pressure-sensitive adhesive or a reactivated adhesive also, the relationship between the transfer foil 30 and the substrate 26 in the above-described example may be reversed in the same way as in the case of a solventless, time-dependent adhesive or a heat-sensitive adhesive.

The following is a description of a material for each of the layers of the transfer foil 30 and an embossing method employed. As a material for the base film 24, biaxially oriented polyethylene terephthalate film is most preferable from the viewpoint of dimensional stability, heat resistance, toughness, etc. Other materials usable for the base film 24 are synthetic films such as polyvinyl chloride film, polypropylene film, polyethylene film, polycarbonate film, cellophane, Vinylon (trademark) film, acetate film, nylon film, polyvinyl alcohol film, polyamide film, polyamide-imide film, etc., and paper such as condenser paper. The thickness of the base film 24 is preferably of the order of 6 μm to 12 μm.

The release layer 23 is provided for the purpose of improving release characteristics and foil breaking characteristics. For the release layer 23, various known materials can be used in accordance with the kind of the base film 24, for example, polymethacrylate resin, polyvinyl chloride resin, cellulose resin, silicone resin, wax containing hydrocarbon as a principal component, polystyrene resin, chlorinated rubber, casein, various kinds of surface-active agent, metallic oxides, etc. These materials can be used alone or in the form of a mixture of two or more so that the peel strength of the release layer 23 is 1 g/inch to 5 g/inch (peeling at 90 degrees)) in combination with the base film 24.

With these materials, the release layer 23 may be formed as a thin film on the base film 24 by a known method, for example, by coating the material in the form of ink. The thickness of the release layer 23 is preferably in the range of from 0.1 μm to 1.0 μm when the peel strength and foil breaking characteristics are taken into consideration.

For the hologram layer 21, various kinds of resin material can be selected with the foil breaking characteristics and transfer heat resistance taken into consideration. Specific examples of materials usable for the hologram layer 21 are unsaturated polyester resin, acryl urethane resin, epoxy modified acrylic resin, epoxy modified unsaturated polyester resin, acrylic ester resin, acrylamide resin, nitrocellulose resin, polystyrene resin, alkyd resin, phenolic resin, etc. These materials may be used alone or in the form of a mixture of two or more. It is also possible to add to these materials a proper amount of a heat- or ultraviolet- curing agent selected from among isocyanate resins, metallic soaps such as cobalt naphthenate and lead naphthenate, peroxides such as benzoyl peroxide and methyl ethyl ketone peroxide, benzophenone, acetophenone, anthraquinone, naphthoquinone, azobisisobutyronitrile, diphenyl sulfide, etc.

The hologram resin layer 21 can be formed by coating the material in the form of ink according to a known method. When it is considered that the foil breaking characteristics (film breaking strength) should be set in the range of from 0.5 g/inch to 1.0 g/inch, the thickness of the hologram resin layer 21 is preferably in the range of from 0.5 μm to 2.0 μm.

A reflective thin film layer for forming the reflecting layer 22 is provided on the surface of the hologram resin layer 21 by deposition, sputtering, ion plating, electrolytic plating, electroless plating, etc. using a metal, a metallic compound, glass, etc.

In the case of a reflection hologram, a metal thin film that reflects light is employed as the reflective thin film layer 2, whereas in the case of a transparent hologram, a holographic effect thin film is employed which exhibits holographic effect in combination with the resin layer 21 and which does not conceal the underlying layer. Thus, the reflective thin film may be properly selected according to the purpose.

Specific examples of metal thin films usable for a reflection hologram are metals such as Cr, Ti, Fe, Co, Ni, Cu, Ag, Au, Ge, Al, Mg, Sb, Pb, Pd, Cd, Bi, Sn, Se, In, Ga, Rb, etc., and oxides and nitrides of these metals. These materials may be used alone or a combination of two or more. Among the above-mentioned metals, Al, Cr, Ni, Ag and Au are particularly preferable. The film thickness is preferably 10 Å to 10,000 Å, more preferably 200 Å to 2,000 Å.

The holographic effect thin film that is employed for a transparent hologram may be made of any material as long as it transmits light so that the holographic effect can be exhibited. Examples of such material include a transparent material which is different in refractive index from the resin layer 21, and a reflective metal thin film layer having a thickness of not larger than 200 Å. In the case of the former, the refractive index may be either larger or smaller than that of the resin layer 21, but the refractive index difference is preferably 0.1 or more, more preferably 0.5 or more. According to an experiment carried out by the present inventors, a refractive index difference of 1.0 or more is the most suitable. By providing a transparent thin film layer 22 that is different in refractive index from the resin layer 21, the required holographic effect can be exhibited and, at the same time, the underlying layer can be seen through the layer 22.

In the case of the latter, although it is a reflective metal film layer, since the thickness is not larger than 200 Å, the light wave transmission factor is large, so that the required holographic effect can be exhibited and, at the same time, the underlying layer can be seen through the layer 22. By setting the film thickness at 200 Å or less, the incongruity in the appearance that has heretofore been given by silver gray of high brightness is eliminated.

Examples of materials usable for the thin film layer 22 include those described below (7) to (12).

(7) Transparent continuous thin films having a larger refractive index than that of the resin layer 21:

This type of thin film include those which are transparent in the visible region and those which are transparent in either the infrared or ultraviolet region. As the former, materials which are similar to those shown in Table 1 are usable; as the latter, materials similar to those shown in Table 2 are usable.

(8) Transparent ferroelectric materials having a larger refractive index than that of the resin layer 21:

Materials which are similar to those shown in Table 3 are usable.

(9) Transparent continuous thin films having a smaller refractive index than that of the resin layer 21:

Materials which are similar to those shown in Table 4 are usable.

(10) Reflective metal thin films having a thickness of not larger than 200 Å:

Materials which are similar to those shown in Table 5 are usable.

It is also possible to use other materials such as Sn, In, Te, Fe, Co, Zn, Ge, Pb, Cd, Bi, Se, Ga, Rb, etc. In addition, oxides and nitrides of the above-mentioned metals can be used alone or a combination of two or more.

(11) Resins which are different in refractive index from the resin layer 21:

The refrative index of these resins may be either larger or smaller than that of the resin layer 21. Examples of such resins are shown in Table 6. It is possible to use ordinary synthetic resins in addition to the above, and it is particularly preferable to use a resin which is largely different in refractive index from the resin layer 21.

(12) Laminates obtained by properly combining the materials (7) to (11):

The materials (7) to (11) may be combined with each other as desired, and the positional relationship between the layers of a laminate may be selected as desired.

Of the thin film layers (7) to (12), the thin film layer (10) has a thickness of not larger than 200 Å, whereas the thickness of the thin film layers (7) to (9), (11) and (12) may be determined as desired as long as the material forming the thin film is transparent in the relevant spectral region; in general, the thickness is preferably 10 Å to 10,000 Å, more preferably 100 Å to 5,000 Å.

When the thin film layer 22 is made of any of the materials (7) to (10), the holographic effect layer 22 can be formed on the resin layer 21 by using a conventional thin film forming means, e.g., vacuum deposition, sputtering, reactive sputtering, ion plating, electrolytic plating, etc., whereas, when the thin film layer 22 is made of the material (11), a conventional coating method can be employed. When the thin film layer 22 is made of the material (12), the above-mentioned means and methods may be properly combined together.

In the second invention, the thickness of the holographic effect layer 22 is preferably 100 Å to 600 Å, in general. If the thickness is less than 100 Å, the reflecting effect becomes inadequate, whereas, if the thickness exceeds 600 Å, the embossing characteristics lower considerably.

A stamper for embossing such a transfer foil can be produced by a known method. However, the stamper needs high pressure resistance and satisfactorily high hardness and tensile strength because a fine dimple pattern on the surface thereof must be pressed into the mating substrate completely. For this reason it is most suitable to obtain a stamper by electrolytic Ni plating method.

The emboss substrate (comprising the base film 24, the release layer 23, the hologram layer 21 and the reflecting layer 22) and the stamper, which are obtained as described above, are put one on top of the other in such a manner that the reflecting layer 22 of the substrate film and the dimpled surface of the stamper are brought into contact with each other, and are then heat-pressed, thereby transferring the dimple pattern to both the reflecting layer 22 and the resin layer 21, and thus completing a transfer foil 30.

EXAMPLE 2

A release layer of wax with a peel strength of 5 g/inch was provided to a thickness of 0.5 μm on the surface of a base film of PET having a thickness of 12 μm, and a hologram layer of acryl urethane resin with a thickness of 1.0 μm was coated on the release layer. Further, aluminum was evaporated to a thickness of 300 Å on the hologram layer to obtain a laminate for duplicate. A relief hologram stamper formed by nickel plating was pressed under heating against the reflecting layer side of the laminate to make a duplicate of the relief hologram, thereby producing a reflection relief hologram transfer foil.

This transfer foil was laid on a copy made by an electrophotographic copy machine employing an ordinary heat-sensitive fixing type toner and uniformly heated from the base film side with a domestic iron, and then the base film was peeled off. As a result, the reflection relief hologram was beautifully transferred to the copy even on the fine pattern thereon without a break.

The following is a description of the fine dimple pattern transfer foil having a reflecting layer according to the third invention.

Figure 5:
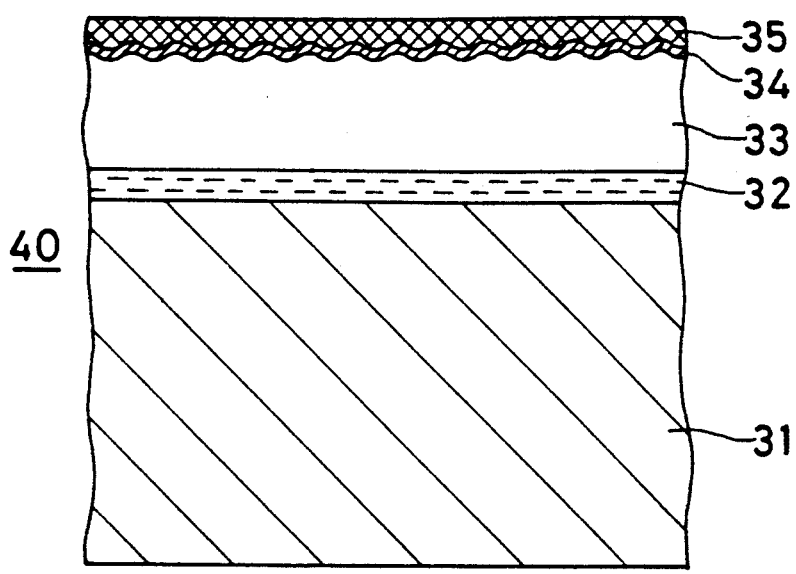
FIG. 5 is a sectional view of the transfer foil according to the third invention, which is arranged in the form of a reflection relief hologram.

FIG. 5 shows a section of the transfer foil of the third invention which is arranged in the form of a reflection relief hologram. The transfer foil 40 comprises a base film 31, a release layer 32 provided thereon, a resin layer 33 formed on the release layer 32 from a thermoplastic resin or the like, a reflecting layer 34 formed on a fine dimple pattern (in this case, an interference fringe relief surface) defined by the surface of the resin layer 33, and a heat-sensitive adhesive layer 35 coated on the exposed surface of the reflecting layer 34. Physical properties, materials, thickness, etc. of these layers will be described later. It should be noted that the reflecting layer 34 comprises either a deposited metal film, e.g., aluminum or tin, or a high refractive index transparent film, e.g., zinc sulfide. With a deposited metal film, a reflection relief hologram that reflects the incident light substantially completely by the metal is formed. With a high-refractive index transparent film, the resulting reflection relief hologram is of the type in which part of the incident light is reflected to reconstruct a hologram image on a background of transmitted light because of Fresnel reflection based on the refractive index difference between the resin layer 33 and the reflecting layer 34.

Let us examine conditions under which the fine dimple pattern transfer foil 40 having the reflecting layer 34 can transfer a fine pattern with high accuracy and high resolution by a hot stamper or thermal head 37.

Figure 6:
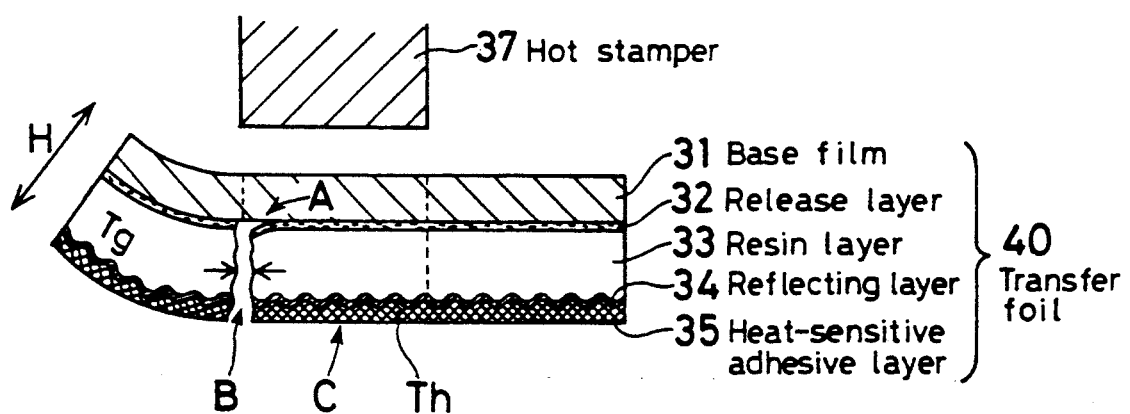
FIG. 6 shows schematically parameters of various portion of the transfer foil shown in FIG. 5.

First, parameters are defined. As shown schematically in FIG. 6, the peel strength of the release layer 32 is defined as A, the film breaking strength of the resin layer 33 as B, the glass transition temperature of the resin layer 33 as $T_g$, the initial bond strength of the heat-sensitive adhesive layer 35 as C, the heat temperature applied to bond the heat-sensitive adhesive layer 35 as $T_h$, and the thickness of the transfer foil 40 as H.

In general, the initial bond strength C of the heat-sensitive adhesive layer 35 is small. Under such circumstances, it is necessary in order to transfer a fine region of the transfer foil 40 precisely according to a transfer pattern of the hot stamper 37 or the like to satisfy the following condition (1):

$$B<A<<C \tag{1}$$

Figure 7:
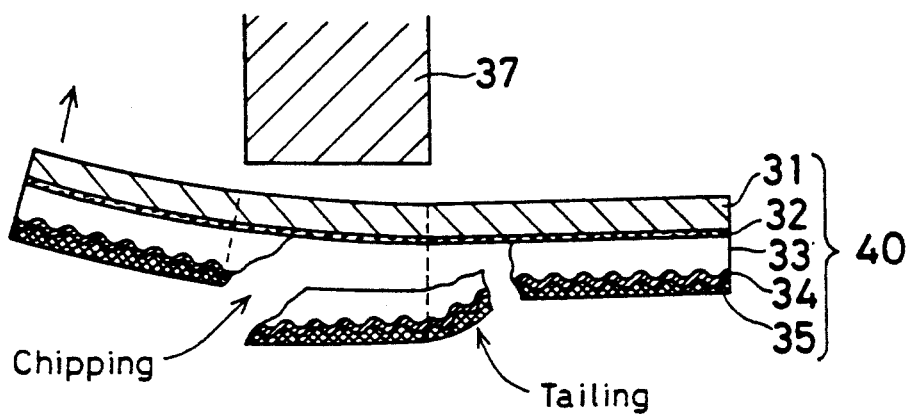
FIG. 7 illustrates conditions of the transfer foil in which the resin layer does not readily break and hence the foil breaking characteristics are inferior, so that chipping and tailing occur, resulting in a failure to transfer a fine region precisely.

In other words, no transfer can be effected unless the peel strength A of the release layer 32 and the film breaking strength B of the resin layer 33 are smaller than the initial bond strength C of the heat-sensitive adhesive layer 35 to a certain extent. If the film breaking strength B of the resin layer 33 is larger than the peel strength A of the release layer 32, the resin layer 33 does not readily break, so that foil breaking characteristics are inferior, resulting in chipping and tailing, as shown in FIG. 7. Thus, no fine region can be transferred precisely. Accordingly, for the heat-sensitive adhesive layer 35, the reflecting layer 22 and the resin layer 33, materials which satisfy the condition (1) must be selected. Specifically, since C is about 10 g/inch or less in general, a material whose A is 1 g/inch to 5 g/inch and a material whose B is 0.5 g/inch to 1.0 g/inch are suitable.

In addition, it is preferable to satisfy the following condition (2):

$$T_g > T_h \tag{2}$$

More specifically, the heat temperature $T_h$ applied to bond the heat-sensitive adhesive layer 35 is a temperature at which the heat-sensitive adhesive is fusion-bonded, and there is therefore a limitation in lowering of $T_h$. In general, $T_h$ is 100° to 150° C. On the other hand, the glass transition temperature $T_g$ of the resin layer 33 is a temperature above which the resin layer 33 exhibits rubber elasticity and below which the resin layer 33 becomes glassy and likely to break. Accordingly, the higher $T_g$ of the resin layer 33, the better the foil breaking characteristics, and the sharper the edges of the transferred pattern. Moreover, if $T_g < T_h$, the resin layer 33 exhibits rubber elasticity at the time of bonding, so that the dimple pattern is likely to disappear due to the pressure applied from the hot stamper 37 or the like. Accordingly, it is preferable to select a material for the 5 resin layer 33 which satisfies the condition (2).

Figure 8:
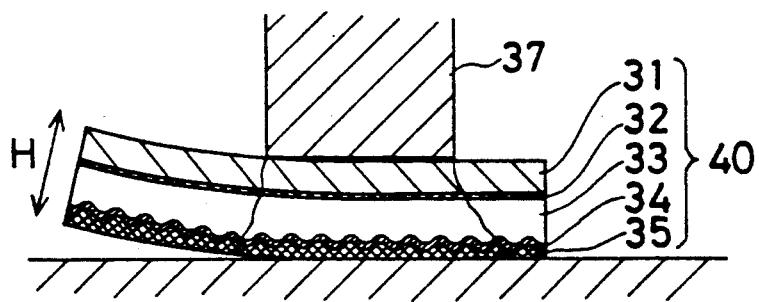
FIG. 8 illustrates the relationship between the thickness of the transfer foil and the heat for transfer.

In addition, since the heat for transfer from the hot stamper 37 or the like diffuses and spreads at the heat-sensitive adhesive layer (35) side of the transfer foil 40, as shown in FIG. 8, it is preferable that the thickness H of the transfer foil 40 should be as small as possible and satisfy the following condition (3):

$$H < 15 \, \mu m \tag{3}$$

It is necessary to satisfy the condition of $H < 3 \, \mu m$ to 15 $\mu m$ in order to enable resolution of a transferred pattern of characters of 9 point or smaller.

Figure 9:
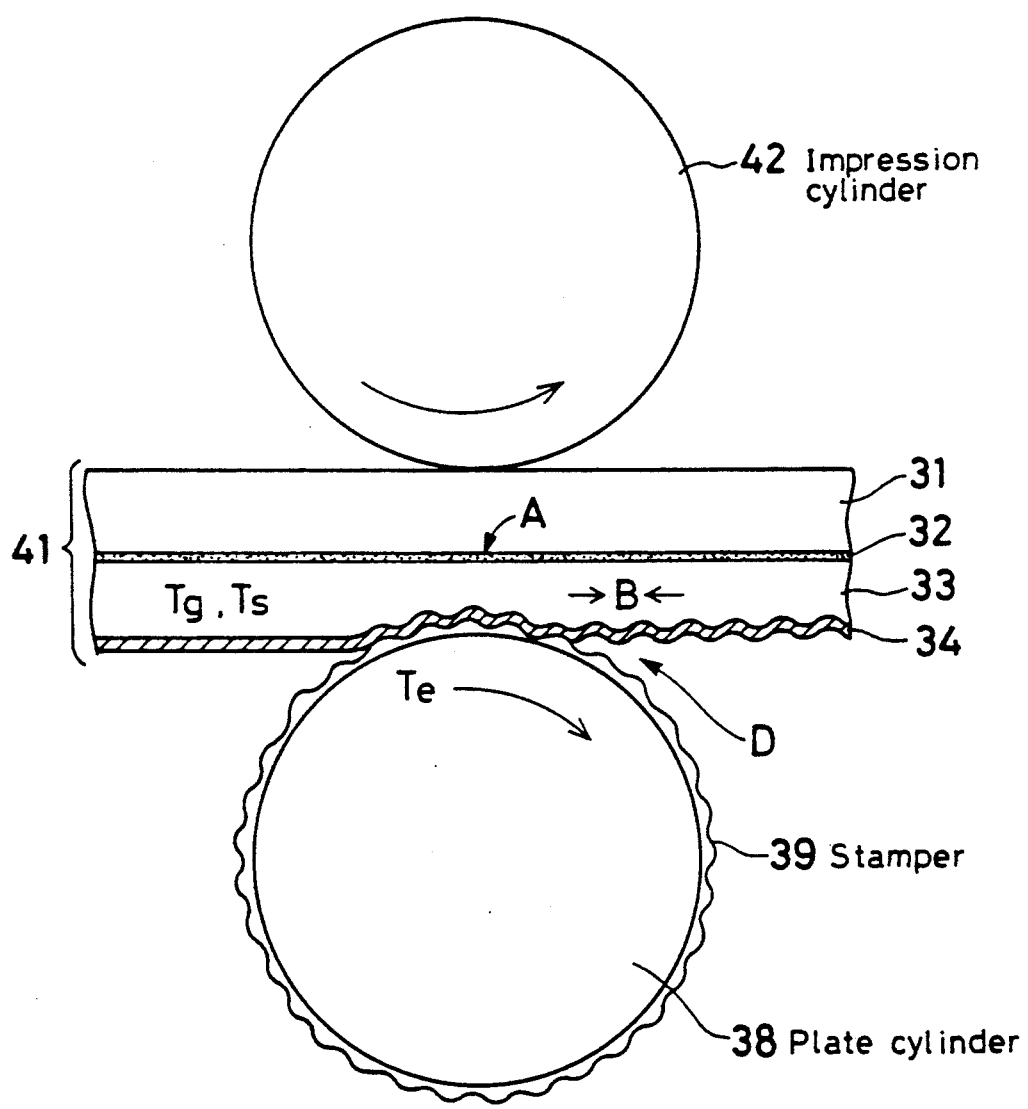
FIG. 9 illustrates the way in which embossing is carried out according to the third invention.
Figure 10:
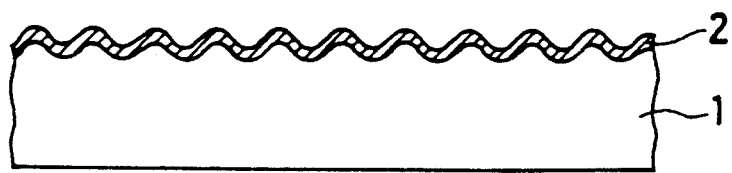
FIG. 10 shows a sectional structure of a typical reflection relief hologram.

Let us now examine conditions for a method of producing a fine dimple pattern transfer foil having the reflecting layer 34 that satisfies the above-described conditions, particularly a reflection relief hologram transfer foil, by press-embossing a fine dimple pattern on a substrate through the reflecting layer 34 formed thereon in advance. FIG. 9 illustrates the wa in which embossing is carried out in the third invention. Reference numeral 41 denotes an embossing blank sheet comprising a base film 31, a release layer 32, a resin layer 33 and a reflecting layer 34, which are stacked in the mentioned order. A plate cylinder 38 is wound at its periphery with a stamper 39 having a hologram relief pattern. Reference numeral 42 denotes an impression cylinder. With the blank sheet 41 passed between the impression cylinder 42 and the plate cylinder 38, these cylinders are rotated as shown by the arrows under heating and with high pressure applied between the cylinders, thereby enabling the relief surface of the stamper 39 to be periodically embossed on both the reflecting layer 34 and the resin layer 33. It is assumed that the force with which the stamper 39 is released from the blank sheet 41 is D, the softening temperature of the resin layer 33 is $T_s$, and the embossing temperature is $T_e$, as illustrated. It should be noted that the glass transision temperature of the resin layer 33 is $T_g$ as in the above.

In order to enable the relief surface of the stamper 39 to be embossed on both the reflecting layer 34 and the resin layer 33 under these preconditions, it is necessary to satisfy the following condition (4):

$$A > B >> D \tag{4}$$

More specifically, if the release force D is larger than the peel strength A of the release layer 32 and the film breaking strength B of the resin layer 33, the transfer foil will be undesirably transferred to the stamper 39. The relationship between A and B is based on the condition (1). In this regard, if embossing is effected over the reflecting layer 34 of a metal or the like, the release force D is smaller than 1 g/inch. On the other hand, if the stamper 39 is embossed directly on the resin layer 33 that is provided with no reflecting layer 34 as in the prior art, the release force D is larger than 1 g/inch in general. If silicone or the like is added to the resin layer 33 in order to minimize the release force D, the adhesion of the reflecting layer 34, which is formed after the embossing process, lowers undesirably.

With regard to the relationship between the softening temperature $T_s$ and the glass transition temperature $T_g$ of the resin layer 33 and the embossing temperature $T_e$, it is necessary, to satisfy the following condition (5):

$$T_g \leq T_e << T_s \tag{5}$$

In this condition, $T_g \leq T_e$ means that embossing is carried out in the rubber elasticy region of the resin layer 33. If embosssing is carried out below the glass transition temperature, the resin layer 33 cracks finely, which is undesirable. As has already been mentioned in connection with the condition (2), the higher $T_g$, the better, and the lower $T_e$, the more readily the embossing process can be executed. It is therefore preferable to carry out embossing at a temperature $T_e$ in the vicinity of $T_g$. The reason for $T_e << T_s$ will be clarified by comparison with the prior art in which the stamper 39 is embossed on the resin layer 33 that is provided with no reflecting layer 34 and thereafter the reflecting layer 34 is provided on the embossed surface. In the prior art, $T_e >> T_s$ because the resin layer 33 is embossed on softening. However, with the prior art process, the embossed dimple pattern is deformed due to the heat remaining after the embossing process, so that the holographic effect (diffraction efficiency in the case of a hologram) deteriorates undesirably. In order to avoid such a defect, an extra cooling process must be provided. In addition, since the embossing temperature $T_e$ is high, expansion of the base film 31 and other problems arise. Hence, the thickness of the base film 31 cannot be minimized, so that it is difficult to satisfy the condition (3).

In contrast, if embossing is carried out in a region where the condition of $T_e < < T_s$ is satisfied, no thermal deformation of the dimple pattern as in the prior art occurs. In addition, the fine dimple pattern is retained effectively by cooperation of the high-pressure embossing and the pattern retaining effect of the reflecting layer 34, so that cooling is not needed. Since the embossing temperature $T_e$ is relatively low, it is possible to minimize the thickness of the base film 31 and hence the thickness of the transfer foil 40, so that the condition (3) can be satisfied. To effect embossing over the reflecting layer 34 under these conditions, in the case of a roll press, it is necessary to employ a pressure of 10 kg/cm to 200 kg/cm in terms of linear pressure; in the case of a flat press, it is necessary to employ a high embossing pressure of 50 kg,/cm² to 1,000 kg/cm² and use a hard stamper 39 having a Vickers hardness of the order of Hv 200 to Hv 600.

The following is a description of a material for each of the layers of the transfer foil 40 and an embossing method, which are selected on the basis of the above-described examination. As a material for the base film 31, biaxially oriented polyethylene terephthalate film is most preferable from the viewpoint of dimensional stability, heat resistance, toughness, etc. Other materials usable for the base film 31 are synthetic films such as polyvinyl chloride film, polypropylene film, polyethylene film, polycarbonate film, cellophane, Vinylon (trademark) film, acetate film, nylon film, polyvinyl alcohol film, polyamide film, polyamide-imide film, etc., and paper such as condenser paper. The thickness of the base film 31 is preferably of the order of 6 μm to 12 μm.

The release layer 32 is provided for the purpose of improving release characteristics and foil breaking characteristics. For the release layer 32, various known materials can be used in accordance with the kind of the base film 31, for example, polymethacrylate resin, polyvinyl chloride resin, cellulose resin, silicone resin, wax containing hydrocarbon as a principal component, polystyrene resin, chlorinated rubber, casein, various kinds of surface-active agent, metallic oxides, etc. These materials can be used alone or in the form of a mixture of two or more so that the peel strength of the release layer 32 is 1 g/inch to 5 g/inch (peeling at 90 degrees)) in combination with the base film 31.

With these materials, the release layer 32 may be formed as a thin film on the base film 31 by a known method, for example, by coating the material in the form of ink. The thickness of the release layer 32 is preferably in the range of from 0.1 μm to 1.0 μm when the peel strength and foil breaking characteristics are taken into consideration.

It is also possible to form a releasable base film by previously mixing the base film with a release layer material so that the base film is releasable.

For the resin layer 33, various kinds of resin material can be selected with the foil breaking characteristics and transfer heat resistance taken into consideration. Specific examples of materials usable for the resin layer 33 are unsaturated polyester resin, acryl urethane resin, epoxy modified acrylic resin, epoxy modified unsaturated polyester resin, acrylic ester resin, acrylamide resin, nitrocellulose resin, polystyrene resin, alkyd resin, phenolic resin, etc. These materials may be used alone or in the form of a mixture of two or more. It is also possible to add to these materials a proper amount of a heat- or ultraviolet- curing agent selected from among isocyanate resins, metallic soaps such as cobalt naphthenate and lead naphthenate, peroxides such as benzoyl peroxide and methyl ethyl ketone peroxide, benzophenone, acetophenone, anthraquinone, naphthoquinone, azobisisobutyronitrile, diphenyl sulfide, etc.

These materials are blended together so that the glass transition temperature $T_g$ is higher than the heat temperature $T_h$ applied during the heat transfer process. Specifically, it is preferable that the glass transition temperature $T_g$ should be 100° C. to 200° C.

The resin layer 33 can be formed by coating the material in the form of ink according to a known method. When it is considered that the foil breaking characteristics (film breaking strength) should be set in the range of from 0.5 g/inch to 1.0 g/inch, the thickness of the resin layer 33 is preferably in the range of from 0.5 μm to 2.0 μm.

A reflective thin film layer for forming the reflecting layer 34 is provided on the surface of the resin layer 33 by deposition, sputtering, ion plating, electrolytic plating, electroless plating, etc. using a metal, a metallic compound, glass, etc.

In the case of a reflection hologram, a metal thin film that reflects light is employed as the reflective thin film layer 2, whereas in the case of a transparent hologram, a holographic effect thin film is employed which exhibits holographic effect in combination with the resin layer 33 and which does not conceal the underlying layer. Thus, the reflective thin film may be properly selected according to the purpose.

Specific examples of metal thin films usable for a reflection hologram are metals such as Cr, Ti, Fe, Co, Ni, Cu, Ag, Au, Ge, Al, Mg, Sb, Pb, Pd, Cd, Bi, Sn, Se, In, Ga, Rb, etc., and oxides and nitrides of these metals. These materials may be used alone or a combination of two or more. Among the above-mentioned metals, Al, Cr, Ni, Ag and Au are particularly preferable. The film thickness is preferably 10 Å to 10,000 Å, more preferably 300 Å to 1,000 Å.

The holographic effect thin film that is employed for a transparent hologram may be made of any material as long as it transmits light so that the holographic effect can be exhibited. Examples of such material include a transparent material which is different in refractive index from the resin layer 33, and a reflective metal thin film layer having a thickness of not larger than 200 Å. In the case of the former, the refractive index may be either larger or smaller than that of the resin layer 33, but the refractive index difference is preferably 0.1 or more, more preferably 0.5 or more. According to an experiment carried out by the present inventors, a refractive index difference of 1.0 or more is the most suitable. By providing a transparent thin film layer 34 that is different in refractive index from the resin layer 33, the required holographic effect can be exhibited and, at the same time, the underlying layer can be seen through the layer 34.

In the case of the latter, although it is a reflective metal film layer, since the thickness is not larger than 200 Å, the light wave transmission factor is large, so that the required holographic effect can be exhibited and, at the same time, the underlying layer can be seen through the layer 34. By setting the film thickness at 200 Å or less, the incongruity in the appearance that has heretofore been given by silver gray of high brightness is eliminated.

Examples of materials usable for the thin film layer 34 include those described below (13) to (18).

(13) Transparent continuous thin films having a larger refractive index than that of the resin layer 33:

This type of thin film include those which are transparent in the visible region and those which are transparent in either the infrared or ultraviolet region. As the former, materials which are similar to those shown in Table 1 are usable; as the latter, materials similar to those shown in Table 2 are usable.

(14) Transparent ferroelectric materials having a larger refractive index than that of the resin layer 33:

Materials which are similar to those shown in Table 3 are usable.

(15) Transparent continuous thin films having a smaller refractive index than that of the resin layer 33:

Materials which are similar to those shown in Table 4 are usable.

(16) Reflective metal thin films having a thickness of not larger than 200 Å:

Materials which are similar to those shown in Table 5 are usable.

It is also possible to use other materials such as Sn, In, Te, Fe, Co, Zn, Ge, Pb, Cd, Bi, Se, Ga, Rb, etc. In addition, oxides and nitrides of the above-mentioned metals can be used along or a combination of two or more.

(17) Resins which are different in refractive index from the resin layer 33:

The refractive index of these resins may be either larger or smaller than that of the resin layer 33. Examples of such resins are shown in Table 6. It is possible to use ordinary synthetic resins in addition to the above, and it is particularly preferable to use a resin which is largely different in refractive index from the resin layer 33.

(18) Laminates obtained by properly combining the materials (13) to (17):

The materials (13) to (17) may be combined with each other as desired, and the positional relationship between the layers of a laminate may be selected as desired.

Of the thin film layers (13) to (18), the thin film layer (16) has a thickness of not larger than 200 Å, whereas the thickness of the thin film layers (13) to (15), (17) and (18) may be determined as desired as long as the material forming the thin film is transparent in the relevant spectral region; in general, the thickness is preferably 10 Å to 10,000 Å, more preferably 100 Å to 5,000 Å.

When the thin film layer 34 is made of any of the materials (13) to (16), the holographic effect layer 34 can be formed on the resin layer 33 by using a conventional thin film forming means, e.g., vacuum deposition, sputtering, reactive sputtering, ion plating, electrolytic plating, etc., whereas, when the thin film layer 34 is made of the material (17), a conventional coating method can be employed. When the thin film layer 34 is made of the material (18), the above-mentioned means and method may be properly combined together.

In the third invention, the thickness of the holographic effect layer 34 is preferably 100 Å to 600 Å, in general. If the thickness is less than 100 Å, the reflecting effect becomes inadequate, whereas, if the thickness exceeds 600 Å, the embossing characteristics lower considerably.

A stamper for embossing such a transfer foil 40 can be produced by a known method. However, the stamper needs high pressure resistance and satisfactorily high hardness and tensile strength because a fin dimple pattern on the surface thereof must be pressed into the mating substrate completely. For this reason, it is most suitable to obtain a stamper by electrolytic Ni plating method. The hardness is preferably in the range of from Hv 200 to Hv 600 in Vickers hardness, and a hardness of Hv 500 to Hv 600 is the most suitable for emboss pressing. If the Vickers hardness is less than Hv 200, the stamper 39 becomes flexible, so that the stamper 39 may be elastically deformed by high pressure applied during the pressing process, resulting in a failure to transfer the dimple pattern faithfully. If the hardness exceeds Hv 600, brittleness increases, so that fatigue destruction of the stamper 39 is likely to occur due to the repeated application of shearing pressure during the pressing process, resulting in a lowering in the durability.

The emboss substrate (comprising the base film 31, the release layer 32, the resin layer 33, and the reflecting layer 34) and the stamper 39, which are obtained as described above, are put one on top of the other in such a manner that the reflecting layer 34 of the substrate film and the dimple surface of the stamper 39 are brought into contact with each other, and are then heat-pressed, thereby transferring the dimple pattern to both the reflecting layer 34 and the resin layer 33, and thus completing a transfer foil 40.

By carrying out this process at a temperature which is in the vicinity of the glass transition temperature of the resin layer 33, preferably at a temperature which is 5° to 20° C. higher than the glass transition temperature, it is possible to realize excellent transfer of the dimple pattern. If the temperature is lower than this temperature range, the dimple pattern cannot be satisfactorily transferred due to the elastic recovery of the resin layer 33. If the temperature is higher than the temperature range, the resin layer 33 is deformed, so that the reflective thin film layer 34 cracks finely, causing whitening and other problems.

To realize satisfactory transfer of the dimple pattern, it is preferably to employ a pressure for pressing in the range of from 10 kg/cm to 200 kg/cm in terms of linear pressure in the case of a roll press and a pressure of 50 kg/cm$^2$ to 1,000 kg/cm$^2$ in the case of a flat press.

In addition, it is necessary to employ for the pressing process a hot plate or a press roll which has been subjected to high-frequency quenching and precision grinding such that the surface accuracy is within ±1 μm and the hardness is more than Hv 600 in terms of Vickers hardness so that the pressure is uniformly applied to the emboss substrate.

By heat-pressing the emboss stamper 39 and the emboss substrate 41 having the reflecting layer 34 under these press conditions, the following advantages are provided:

(1) Since the reflecting layer 34 is not thermally deformed, the dimple pattern formed on the resin layer 33 is not deformed again by the heat remaining after the pressing process, and a faithful dimple pattern can be duplicated.

(2) Since the reflecting layer 34 has a higher heat softening temperature than that of a resin material and is superior in the release characteristics with respect to the stamper 39, there is no possibility of the reflecting layer 34 being transferred to the stamper 39 and there is therefore no need for a cooling process.

(3) Since the reflecting layer 34 need not be provided after the embossing process, there is no thermal deformation of the dimple pattern.

(4) Since emboss pressing is effected directly on the reflecting layer 34, the dimple pattern is transferred precisely and a uniform film thickness is obtained in comparison to the prior art in which the reflecting layer 34 is provided after the embossing process.

(5) Since the reflecting layer 34 is provided in advance, deposition and other associated processes need not be carried out for each lot, so that the process efficiency is high. In addition, since there is no mixing of dust, a product of high quality is obtained.

The heat-sensitive adhesive layer 35 is formed on the surface of the reflecting layer 34 of the hologram transfer foil obtained in this way by using a material which comprises at least one thermoplastic resin selected from among polyacrylic acid ester resin, polyvinyl chloride resin, chlorinated polypropylene resin, polyester rein, polyurethane resin, rosin or rosin modified maleic resin, and vinyl chloride-acetate resin, and a proper amount of a pigment or a dye added thereto.

EXAMPLE 3

A release layer of wax with a peel strength of 5 g/inch was provided to a thickness of 0.5 μm on the surface of a base film of PET having a thickness of 12 μm, and a resin layer of acryl urethane resin having a thickness of 1.0 μm, a film breaking strength of 1 g/inch, a glass transition temperature of 140° C. and a softening temperature of 160° C. as coated on a release layer. Further, aluminum was evaporated to a thickness of 300 Å on the resin layer to obtain a laminate for duplicate. A relief hologram stamper formed by nickel plating and having a Vickers hardness of Hv 500 was wound around a plate cylinder, and it was heated to 145° C. and pressed against the reflecting layer side of the laminate with a linear pressure of 150 kg/cm, thereby making a duplicate of the relief hologram. The release force in this process was 0.5 g/inch at a speed of 20 m/min. Thereafter, a heat-sensitive adhesive layer of a vinyl chloride-acerate resin was coated to a thickness of 1.5 μm on the surface of the laminate formed with the duplicate relief hologram and then dried, thereby producing a reflection relief hologram transfer foil. The overall thickness of the transfer foil was 14 μm. It would be noted that the initial bond strength of the heat-sensitive adhesive layer is 50 g/inch or less in general.

The hologram transfer foil obtained in this way was laid on a PET film (188 μm) coated at the surface thereof with a vinyl chloride-acetate resin, and heat transfer was effected at 0.6 mJ/dot by using a thin-film thermal head (8 dots/mm).

The transfer printed section thus obtained was superior in the foil breaking characteristics, adhesion, etc., and all the dots were resolved.

Further, the above-described hologram transfer foil was laid on coat paper (Tokubishi Art: trade name) and hot-stamped at a transfer temperature of 145° C., a press linear pressure of 10 kg/cm and a press time of 0.2 sec by using each of parallel-line test chart stampers varying in line widths and pitches and typographic test chart stampers varying in point size. The finest parallel-line pattern that was capable of being resolved was the one having a pitch of 0.4 mm and a line width of 0.2 mm. In the case of the typography, 8-point types were the smallest ones that were clearly transferred.

As has been described above, according to the information recording method and medium of the first invention, it is possible to add information, e.g., an image or a character, other than information originally recorded on a reflection relief hologram by preparing a transfer foil having a reflection relief hologram comprising a resin layer and a reflecting layer, at least a part of the reflection relief hologram being formed as a transferable region, transferring a predetermined portion of the transferable region to the surface of an object to which information is to be transferred, and heating at least a part of the transferred portion with a heating means, thereby destroying the reflecting layer, or smoothing a dimple pattern formed by the surface of the resin layer and the reflecting layer. Thus, it is possible to diversify the recording and display forms of hologram transfer foils.

According to the second invention, the reflection relief hologram transfer foil comprises at least a resin layer having a fine dimple pattern, e.g., a relief hologram, a relief diffraction grating, etc., formed on the surface thereof, a reflecting layer formed on the dimpled surface of the resin layer, a releasable base film stacked on the side of the resin layer which is opposite to the side thereof where the reflecting layer is provided, and an adhesive or the like is selectively coated on a select pattern region of the surface of a substrate to which information is to be transferred, or of the surface of the reflecting layer or a protective resin layer of the transfer foil, thereby selectively transferring the reflection relief hologram only to the adhesive coating region. Accordingly, a fine transfer hologram pattern can be readily formed over a large area.

According to the fin dimple pattern transfer foil having a reflecting layer of the third invention, the peel strength between the releaseable base film and the resin layer is 1 g/inch to 5 g/inch and set to be larger than the film breaking strength of the resin layer. Therefore, a fine dimple pattern can be thermally transferred precisely even with weak adhesive force, with excellent foil breaking characteristics and without chipping or tailing. According to the method of producing a fine dimple pattern transfer foil having a reflecting layer of the third invention, a laminate comprising a releasable base film, a resin layer, and a reflecting layer, which are stacked in the mentioned order, is prepared, and a dimpled surface of a stamper having a fine dimple pattern recorded thereon is embossed on the reflecting layer side of the laminate at high temperature and high pressure, thereby transferring the fine dimple pattern to both the reflecting layer and the resin layer. Accordingly, the fine dimple pattern can be duplicated faithfully without being deformed again and without the need for a deposition process, a cooling process, etc. In addition, it is possible to readily produce a transfer foil which enables a fine dimple pattern to be thermally transferred precisely with excellent release characteristics and superior foil breaking characteristics.

What is claimed is:

1. An information recording method comprising the steps of:

preparing a transfer foil having a reflection relief hologram comprising at least a resin layer having a fine dimple pattern formed on the surface thereof, and a reflecting layer formed on the dimpled surface of said resin layer, at least a part of said reflection relief hologram being formed as a transferable region;

transferring a predetermined portion of said transferable region to the surface of an object to which information is to be transferred; and heating at least a part of the transferred portion with a heating means, thereby destroying said reflecting layer.

2. An information recording method comprising the steps of:

preparing a transfer foil having a reflection relief hologram comprising at least a resin layer having a fine dimple pattern formed on the surface thereof, and a reflecting layer formed on the dimpled surface of said resin layer, at least a part of said reflection relief hologram being formed as a transferable region;

transferring a predetermined portion of said transferable region to the surface of an object to which information is to be transferred; and heating at least a part of the transferred portion with a heating means, thereby smoothing a dimple pattern formed by the surface of said resin layer and said reflecting layer.

3. An information recording medium which has information recorded thereon by the method of claim 1.

4. An information recording medium which has information recorded thereon by the method of claim 2.

* * * * *